United States Patent [19]

Ohkubo

[11] Patent Number: 4,641,880
[45] Date of Patent: Feb. 10, 1987

[54] REAR DOOR STRUCTURE FOR MOTOR VEHICLES

[75] Inventor: Tsuyoshi Ohkubo, Tochigi, Japan

[73] Assignee: Honda Giken Kogyo Kabushiki Kaisha, Tokyo, Japan

[21] Appl. No.: 830,643

[22] Filed: Feb. 18, 1986

[30] Foreign Application Priority Data

Feb. 18, 1985 [JP] Japan .................................. 60-21630

[51] Int. Cl.⁴ ............................................. B60J 5/10
[52] U.S. Cl. ..................................... 296/154; 296/76; 49/476
[58] Field of Search ......................... 296/146, 154, 76; 49/476

[56] References Cited

U.S. PATENT DOCUMENTS

| 4,433,866 | 2/1984 | Hagiwara | 296/76 |
| 4,436,336 | 3/1984 | Shimizu | 296/76 |
| 4,508,382 | 4/1985 | Tsumoto et al. | 296/154 |

Primary Examiner—Robert R. Song
Attorney, Agent, or Firm—Irving M. Weiner; Joseph P. Carrier; Pamela S. Burt

[57] ABSTRACT

A rear door structure in a hatchback motor vehicle includes a pane of glass having a pair of side edges curved downwardly, and a frame supporting the pane of glass in surrounding relation to an outer peripheral edge thereof. The frame includes a front frame member pivotally mounted on the vehicle body, a rear frame member supporting a rear edge of the pane of glass and having a first channel for receiving water flowing from an outer surface of the rear frame member when the rear door structure is opened, and a pair of side frame members supporting side edges of the pane of glass and each having a second channel communicating with the first channel. The vehicle body includes rear pillars each having a drip channel communicating with the second channels. When the rear door structure is lifted open, water collected in the first channel flows through the second channels into the drip channel, from which the water is drained out.

6 Claims, 7 Drawing Figures

REAR DOOR STRUCTURE FOR MOTOR VEHICLES

BACKGROUND OF THE INVENTION

1. Field of the Invention

The present invention relates to a rear door structure for so-called hatchback motor vehicles which includes a rear door or hatch pivotally mounted at its upper edge to the rear open end of the motor vehicle.

2. Discussion of Relevant Art

There has been known a rear door structure for use in hatchbacks which has a rear door or hatch with its upper edge pivotally coupled to the rear open end of the motor vehicle. The rear door comprises a frame surrounding a flat pane of glass.

FIGS. 5, 6, and 7 of the accompanying drawings illustrate one recent rear door structure which is designed to achieve a better appearance and an improved aerodynamic effect. The rear door structure includes a rear door or hatch 100 including a pane of glass 101 having a pair of side marginal edge portions 101a, 101a curved downwardly and forwardly so as to smoothly blend into the side walls of the vehicle body. The pane of glass 101 is supported by a surrounding frame 100a with a weather strip 102 interposed therebetween and extending around the outer peripheral edge of the pane of glass 101. The upper and side edges of the rear door 100 are so shaped that they and the rear edges of a roof panel 103 and rear pillars 104 of the vehicle body jointly form smooth continuous surfaces when the rear door 100 is closed. The rear door frame 100a includes a front frame member pivotally coupled to the rear edge of the roof panel 103 and a rear frame member 105 extending rearwardly from the pane of glass 101. By lifting the rear frame member 105, the rear door 100 is swung open upwardly about the rear edge of the roof panel 103.

The rear pillars 104 extend obliquely forwardly and inwardly in the upward direction and are progressively narrowed upwardly. When the rear door 100 as closed is viewed in plan as shown in FIG. 6, the rear door 100 looks progressively wider from its front edge toward the rear edge of the pane of glass 101, with the rear frame member 105 reduced in width. As a result, when the rear door 100 as it is open is viewed in plan, its edges are indicated by the dot-and-dash lines, exposing a portion S of the passenger's compartment.

When the motor vehicle is wet with rain or a washing solution, water droplets remain on the surface of the rear frame member 105, particularly between the rear frame member 105 and the weather strip 102. As the rear door 100 is lifted open, it is tilted downwardly in the forward direction, allowing the water droplets to flow down the rear frame member 105 forwardly beyond the weather strip 102 and laterally along the weather strip 102. Since the side margins 101a of the glass pane 101 are curved as described above, the water droplets flowing in the forward direction are led to flow laterally, and those flowing laterally tend to undesirably fall off the side edges of the rear door 100 into the exposed portion S of the passenger's compartment as shown in FIG. 7.

SUMMARY OF THE INVENTION

In view of the aforesaid drawback of the existing rear door structor for motor vehicles, it is an object of the present invention to provide a rear door structure having means for preventing water droplets from dropping off the outer rear door surface into a passenger's compartment.

According to the present invention, there is provided a rear door structure in a motor vehicle having a vehicle body, comprising a pane of glass having a pair of side edges curved downwardly, and a frame supporting the pane of glass in surrounding relation to an outer peripheral edge thereof, the frame including a front frame member pivotally mounted on the vehicle body, a rear frame member supporting a rear edge of the pane of glass and having a first channel for receiving water flowing from an outer surface of the rear frame member when the rear door structure is opened, and a pair of side frame members supporting side edges of the pane of glass and each having a second channel communicating with the first channel. The vehicle body includes rear pillars each having a drip channel communicating with the second channels. When the rear door structure is lifted open, water collected in the first channel flows through the second channels into the drip channel, from which the water is drained out. Therefore, such water is prevented from dropping into the passenger's compartment when the rear door structure is opened.

The above and further objects, details and advantages of the present invention will become apparent from the following detailed description of a preferred embodiment thereof, when taken in conjunction with the accompanying drawings.

DETAILED DESCRIPTION OF THE PREFERRED EMBODIMENT

Figure 1:
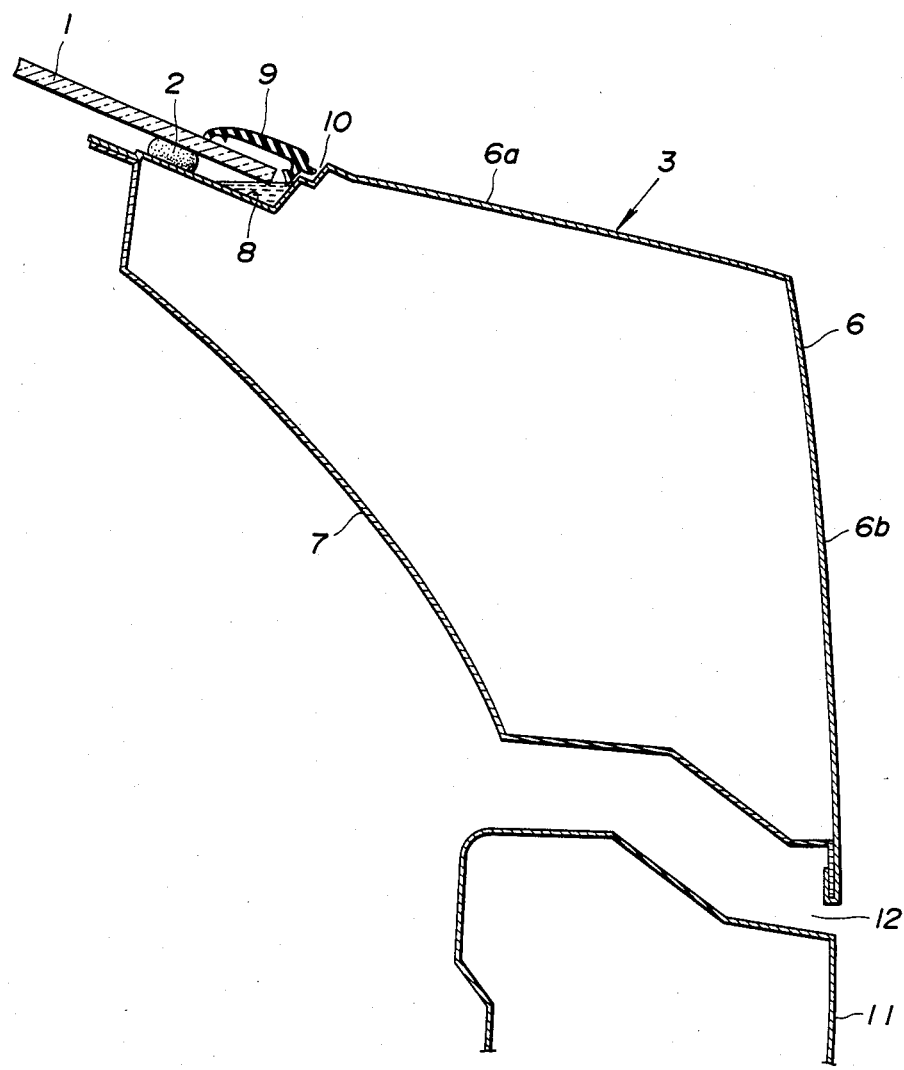
FIG. 1 is a fragmentary vertical cross-sectional, side view of a rear door structure according to the present invention.
Figure 2:
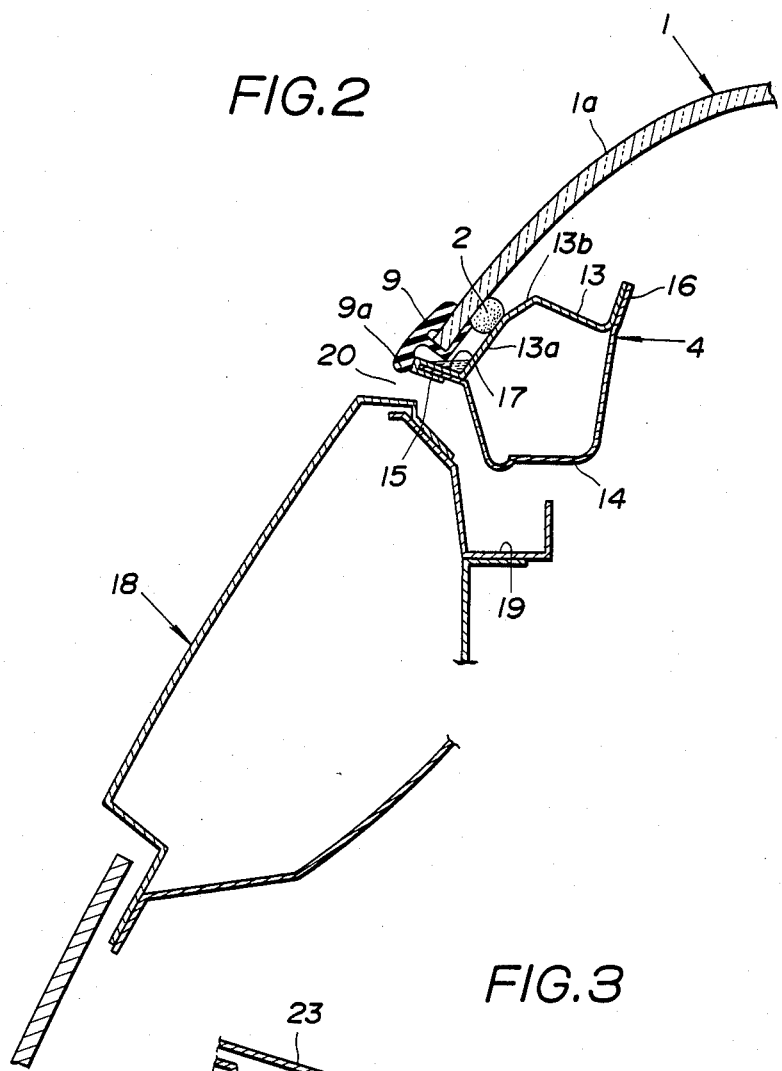
FIG. 2 is another fragmentary vertical cross-sectional view of the rear door structure of the invention, but looking in the forward direction.
Figure 3:
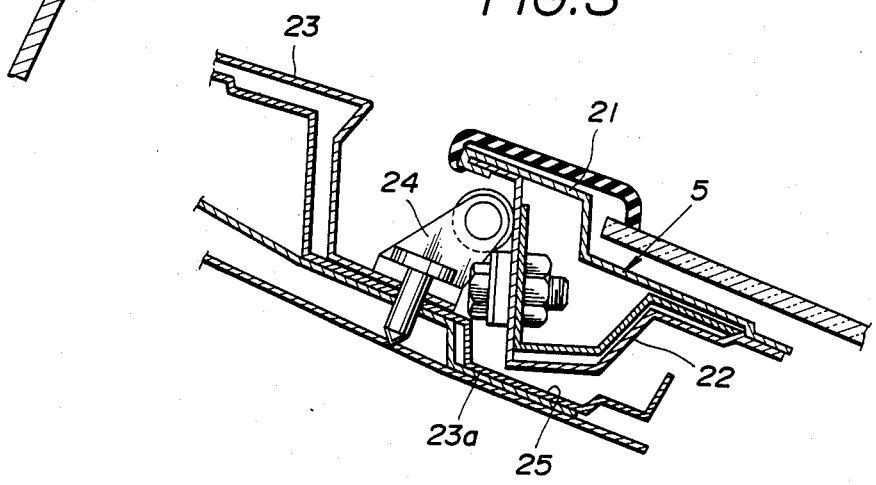
FIG. 3 is a fragmentary vertical cross-sectional view of a hinge of the rear door structure.

As shown in FIGS. 1 and 2, a rear door structure according to the present invention for use in a hatchback motor vehicle has a pane of glass 1 bonded by an adhesive 2 along its lower peripheral edge surface to a frame. The frame comprises a rear frame member 3 (FIG. 1), a pair of side frame members 4 (only one shown in FIG. 2), and a front frame member 5 (FIG. 3). The pane of glass 1 has side marginal edge portions 1a (only one shown in FIG. 2) curved smoothly downwardly.

As illustrated in FIG. 1, the rear frame member 3 is in the form of a hollow construction comprising an outer steel panel 6 and an inner steel panel 7 joined at their upper and lower ends. The outer panel 6 has an upper panel portion 6a inclined downwardly in the rearward direction when the rear door structure is closed. The upper panel portion 6a has an upwardly opening channel or groove 8 extending along a front edge thereof.

The pane of glass 1 is affixed by the adhesive 2 to the upper panel portion 6a in front of the channel 8. A weather strip 9 is fitted around the outer peripheral edge of the glass pane 1, the channel 8 being postitioned below the weather strip 9. As shown in FIG. 1, there is a gap or clearance 10 defined between the weather strip 9 and the upper panel portion 6a of the outer panel 6, the gap 10 communicating with the channel 8. The outer panel 6 also has a substantially vertical rear panel portion 6b lying substantially flush with a rear portion 11 of a rear panel of the motor vehicle body. With the rear door structure closed, a gap or clearance 12 is defined between the rear portion 11 and the rear frame member 3 to allow the user's hands to be inserted therein for lifting the rear door structure.

As shown in FIG. 2, the side frame member 4 has a hollow shape comprising an upper steel panel 13 and a lower steel panel 14 which are joined along right and left edges 15, 16 thereof. The left joined edges 15 extend obliquely upwardly in the outward direction, whereas the right joined edges 16 extend obliquely inwardly in the upward driection. The upper panel 13 has an upwardly bulging central portion. The upper panel 13 includes a left or outer side section comprising an inclined portion 13a lying substantially parallel to the side marginal edge portion 1a of the glass pane 1 and another inclined portion 13b extending more horizontally than the inclined portion 13a. The outer edge of the side marginal edge portion 1a is affixed by the adhesive 2 to the inclined portion 13a. The inclined portion 13a and the joined edges 15 jointly define an upwardly opening channel or groove 17 connected to the channel 8 of the rear frame member 3.

The weather strip 9 fixed to the peripheral edge of the glass pane 1 has a distal edge 9a held against the outer end of the joined edges 15. The outer surface of the weather strip 9 and the outer surface of a rear pillar 18 lie substantially flush with each other. The rear pillar 18 has a drip channel 19 remote from the outer surface thereof, i.e., within the vehicle body. When the rear door structure is closed, there is a gap or clearance 20 defined between the edge 9a of the weather strip 9 or the joined edges 15 and the upper edge of the rear pillar 18. Water which may enter through the gap 20 flows into the drip channel 19, and flows down the drip channel 19 toward the rear end of the vehicle, from which the water can be drained.

Figure 4:
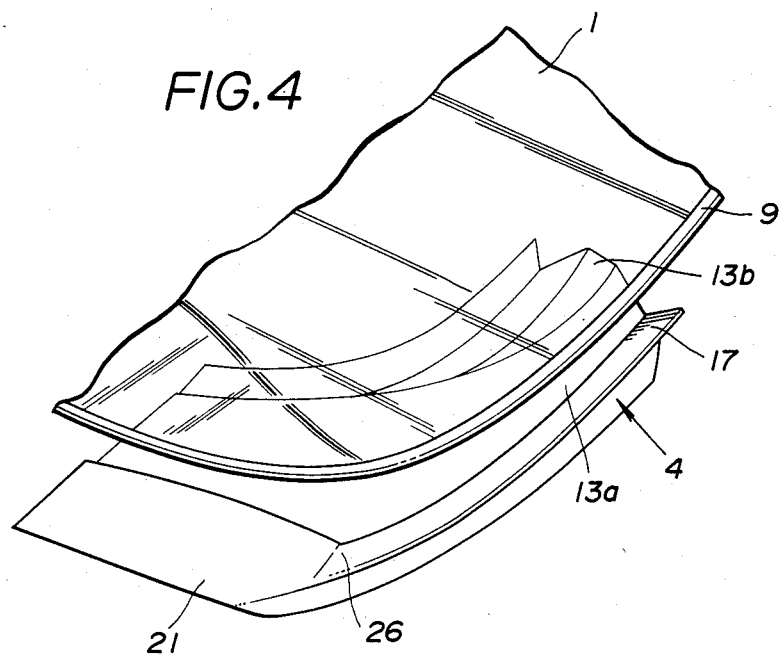
FIG. 4 is a fragmentary perspective view of a front, upper portion of the rear door structure.
Figure 5:
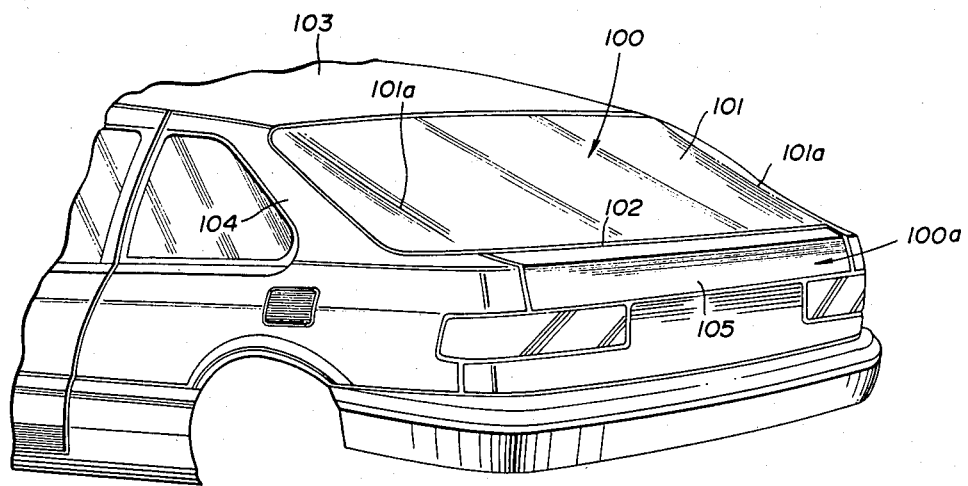
FIG. 5 is a fragmentary perspective view of an existing rear door structure.
Figure 6:
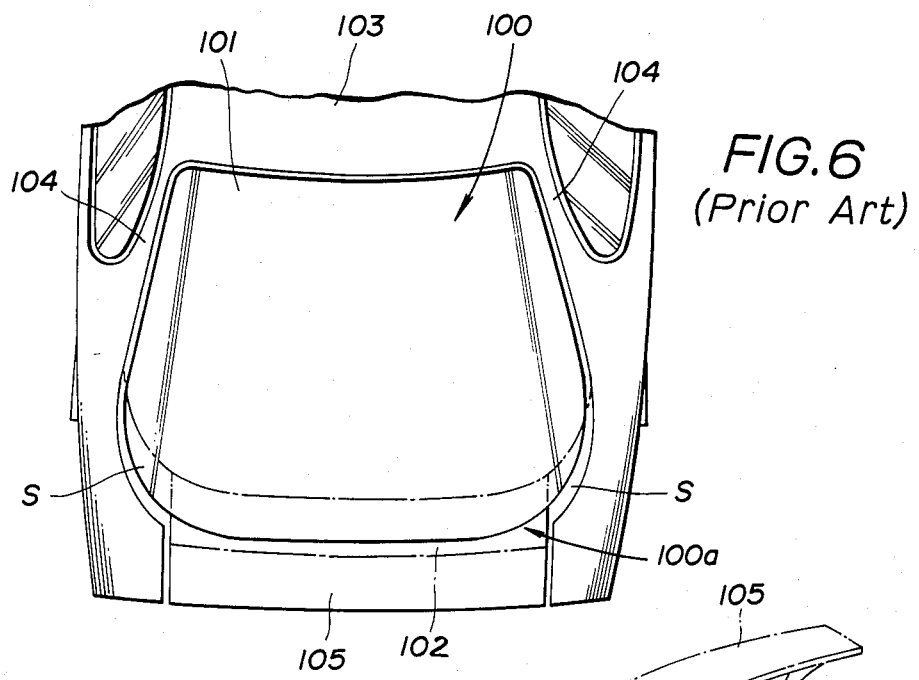
FIG. 6 is a fragmentary plan view of the rear door structure shown in FIG. 5.
Figure 7:
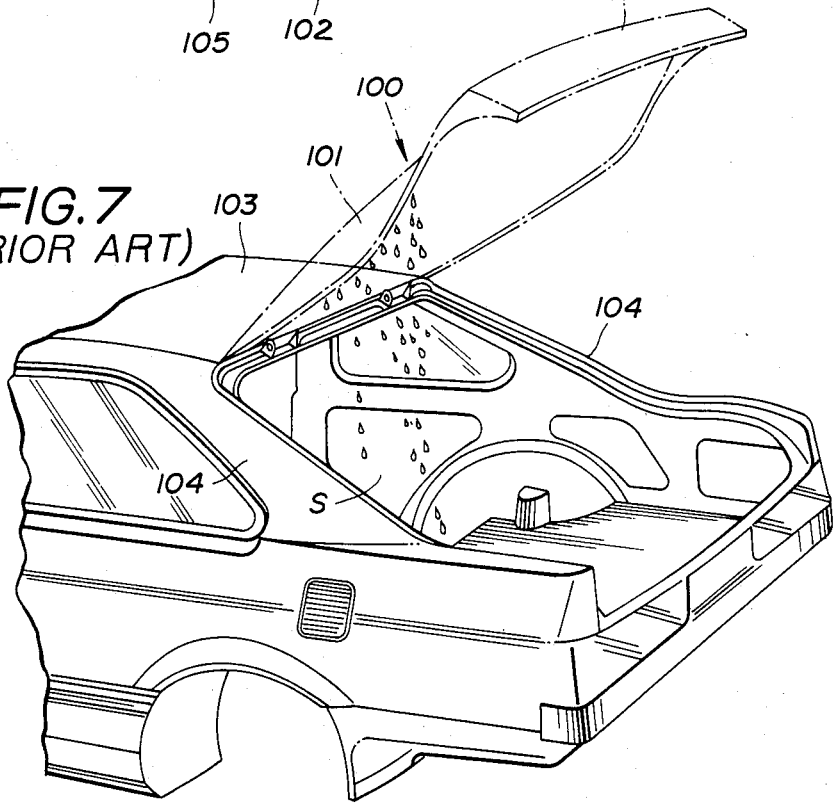
FIG. 7 is a fragmentary perspective view of the rear door structure of FIG. 5 as it is opened upwardly.

As illustrated in FIG. 3, the front frame member 5 is in the form of a hollow body comprising an upper steel panel 21 and lower steel panel 22 which are joined along their front and rear edges. The vehicle body includes a roof panel 23 having a rear edge along which there extends a frame 23a to which the front frame member 5 is pivotally fixed by means of hinges 24 (only one shown). The frame 23a has an upwardly opening drip channel 25 connected to the drip channel 19 of the rear pillar 18. As shown in FIG. 4, the channel 17 of the side frame member 4 is progressively shallower toward the front frame member 5, and has a substantially flat or horizontal end 26 joined to each end of the front frame member 5, whereby the channel 17 communicates with the channel 25. When the rear door structure is lifted upwardly about the hinges 24, any water in the channel 17 is forced by gravity to flow over the horizontal ends 26 into the drip channel 25.

When the rear door structure is opened as it is wet with rain or a washing solution, water droplets scattered on the upper panel portion 6a of the rear frame member 3 are caused to flow in the forward direction through the gap 10 into the channel 8. The water collected in the channel 8 then flows along the channels 17 of the side frame members 4 into the drip channel 25 of the frame 23a, from which the water passes through the drip channels 19 of the rear pillars 18 and is drained out.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A rear door structure in a motor vehicle having a vehicle body, comprising:
    a pane of glass having a pair of side edges curved downwardly; and
    a frame supporting said pane of glass in surrounding relation to an outer peripheral edge thereof, said frame including a front frame member pivotally mounted on said vehicle body, a rear frame member supporting a rear edge of said pane of glass and having a first channel for receiving water flowing from an outer surface of the rear frame member when the rear door structure is opened, and a pair of side frame members supporting side edges of said pane of glass and each having a second channel communicaing with said first channel.

2. A rear door structure according to claim 1, wherein said vehicle body includes a pair of rear pillars each having a first drip channel communicating with said second channels near said front frame member, whereby water collected in said first channel can flow through the second channels into the first drip channels.

3. A rear door structure according to claim 1, further including a weather strip fitted around the outer peripheral edge of said pane of glass, said first channel being positioned below said weather strip.

4. A rear door structure according to claim 3, wherein said rear frame member includes an upper panel portion having said outer surface, said weather strip and said upper panel portion jointly defining a gap therebetween which communicates with said first channel.

5. A rear door structure according to claim 2, wherein said vehicle body includes a roof panel and a roof frame fixed to said roof panel, said roof frame having a second drip channel communicating between said second channels and said first drip channels.

6. A rear door structure according to claim 5, wherein each of said second channels is progressively shallower toward said front frame member, and communicates with said second drip channel near said front frame member.

* * * * *